United States Patent [19]

Tsukahara

[11] Patent Number: 4,697,216
[45] Date of Patent: Sep. 29, 1987

[54] DISK DRIVE APPARATUS WITH AUTOMATIC CENTERING ARRANGEMENT

[75] Inventor: Nobuhiko Tsukahara, Kanagawa, Japan

[73] Assignee: Sony Corporation, Tokyo, Japan

[21] Appl. No.: 697,236

[22] Filed: Feb. 1, 1985

[30] Foreign Application Priority Data

Feb. 6, 1984 [JP] Japan .................. 59-19648

[51] Int. Cl.[4] .................. G11B 5/010; G11B 25/04
[52] U.S. Cl. .................. 360/97; 360/133; 360/99; 369/271; 369/282
[58] Field of Search .................. 360/97–99, 360/133; 369/271, 282, 289, 290

[56] References Cited

U.S. PATENT DOCUMENTS

| | | | |
|---|---|---|---|
| 4,040,089 | 8/1977 | Guarracini | 369/271 |
| 4,152,740 | 5/1979 | Stratton | 360/99 X |
| 4,175,274 | 11/1979 | Mann | 360/133 |
| 4,517,617 | 5/1985 | Tsuji et al. | 360/133 |
| 4,613,921 | 9/1986 | Holmes | 360/133 |

FOREIGN PATENT DOCUMENTS

| | | | |
|---|---|---|---|
| 58-115668 | 7/1983 | Japan | 369/282 |
| 59-8176 | 1/1984 | Japan | 360/99 |
| 59-54089 | 4/1984 | Japan | 360/99 |
| 59-87677 | 5/1984 | Japan | 360/99 |
| 2007005 | 5/1979 | United Kingdom | 360/133 |

Primary Examiner—John H. Wolff
Assistant Examiner—Alfonso Garcia
Attorney, Agent, or Firm—Lewis H. Eslinger; Alvin Sinderbrand

[57] ABSTRACT

In a rotary drive apparatus for a disk of the type in which the disk is mounted on a turntable, a central pin arranged at the center of the turntable and a drive pin arranged in a position spaced radially from this center of the turntable are respectively inserted in a central hole of the disk and a drive hole spaced radially from the central hole of the disk so that the disk is driven by the drive pin upon rotation of the turntable, and the drive hole of the disk is urged radially away from the center of the turntable by the drive pin so that the periphery of the central pin is pushed against the edge of the central hole for making the center of the disk coincide with that of the turntable; the drive pin is mounted for movement in a direction opposite to the rotating direction of the turntable and simultaneously in a direction radially away from the center of the turntable in reaction to the driving of the disk by the drive pin, thereby to ensure that the force that moves the drive hole of the disk in the direction away from the center of the turntable is increased in proportion to a torque loaded on the disk, and as the result, it becomes possible, without limiting the torque, to ensure that the center of the disk will coincide accurately and surely with that of the turntable.

11 Claims, 14 Drawing Figures

FIG. 1   *PRIOR ART*

FIG. 4
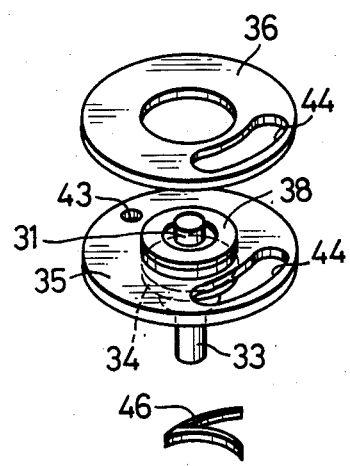
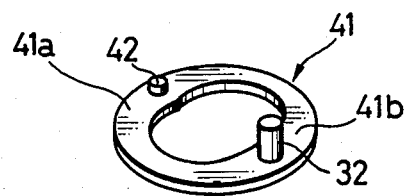
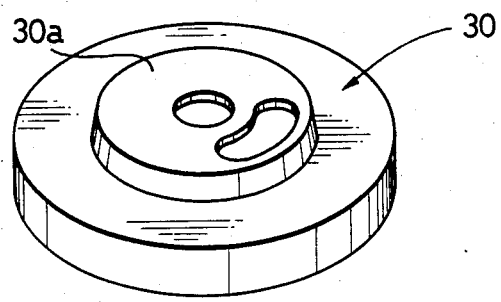

DISK DRIVE APPARATUS WITH AUTOMATIC CENTERING ARRANGEMENT

BACKGROUND OF THE INVENTION

1. Field of the Invention

The present invention relates to a rotary drive apparatus for a disk, such as, for example, a microfloppy disk and more particularly is directed to a rotary drive apparatus of the type in which, the disk is mounted on a turntable and automatically centered in respect to the latter.

2. Description of the Prior Art

A conventional rotary drive apparatus for a microfloppy disk (to be referred to as a disk hereinafter) will first be described with reference to FIGS. 1 to 3.

As is known, a disk 1 is rotatably housed inside a disk cassette 2 comprising upper and a lower halves 2a and 2b. A central hole 4 and a drive hole 5 are formed respectively at the center and at a position spaced radially therefrom in a center plate 3 which is made of metal and fixed at the center of the disk 1. The central hole 4 has a square shape, and the drive hole 5 has a rectangular shape. The center plate 3 is loosely fitted into a turntable receiving hole 6 formed at the center of the lower half 2b. A pair of upper and lower pad/head receiving holes 7 (FIG. 1) are formed respectively in the upper and lower halves 2a and 2b so as to extend along the radial direction of the disk 1 and are opened/closed by a shutter 8.

A central pin 11 and a drive pin 12 are arranged respectively at the center and at a position spaced radially therefrom on a turntable 10 of a disk player (FIG. 2). The central pin 11 is disposed at the upper end of a motor shaft 13 which is driven by a motor (not shown) arranged below the turntable 10. A ball bearing 14 is mounted on the upper end of the drive pin 12. The drive pin 12 is perpendicularly fixed to a pin mounting portion 15a of a leaf spring 15 of a substantially annular shape. The leaf spring 15 is fastened to the turntable 10 with a plurality of screws 17 through a spacer 16. A magnetic chuck 20 above the leaf spring 15 comprises a magnet plate 18 and a yoke plate 19 and is also fastened to the turntable 10 by the screws 17. A smooth sheet 21 of a nonmagnetic material is fixed onto the magnet plate 18. The upper end of the drive pin 12 with the ball bearing 14 thereon projects upward through a hole 22 formed in the magnet plate 18 and the yoke plate 19.

The torsion of the pin mounting portion 15a of the leaf spring 15 allows the drive pin 12 to pivot in the radial direction of the turntable 10 as indicated by arrows a and a'.

In a disk player, the shutter 8 is open, as shown in FIG. 1, and the disk 1 in the disk cassette 2 is horizontally mounted on the turntable 10. When the disk 1 is mounted in this manner, a pad 24 and a recording/reproducing head 25 are inserted into the pad/head receiving holes 7 of the disk cassette 2. The disk 1 is elastically pressed against the recording/reproducing head 25 by the pad 24. Meanwhile, as shown in FIGS. 2 and 3, when the disk 1 is mounted, the central pin 11 and the drive pin 12 of the turntable 10 are inserted respectively into the central hole 4 and the drive hole 5 of the center plate 3, and the center plate 3 is attracted by the magnetic chuck 20 while being maintained horizontally on the smooth sheet 21.

After the disk 1 is mounted in this manner, the turntable 10 is driven by the motor in the direction of arrow b on FIGS. 1 and 3. The drive pin 12 acts against an end edge 5a of the drive hole 5 of the center plate 3 which is at its front side with respect to the rotating direction of the turntable 10, and thereby the disk is rotated in the direction of arrow b. At the same time, the recording-/reproducing head 25 is moved in the radial direciton (indicated by arrows c and c' in FIG. 1) so as to perform recording or reproduction of data on or from the disk 1.

In this conventional apparatus, at the initiation of the driving of the disk 1, when the turntable 10 is driven in the direction of arrow b after the drive pin 12 has been inserted in the rear portion of the drive hole 5 with respect to the rotating direciton of the turntable 10, as indicated in alternate long and short dashed lines in FIG. 3, the drive pin 12 is moved in the direction of arrow b within the drive holes 5 and is pressed against the front end edge 5a with respect to the rotating direction of the turntable 10 and also pressed against the outer side edge 5b in a direction toward the outer periphery of the turntable 10, as indicated by the solid line in FIG. 3. During this operation, the torsion of the pin mounting portion 15a of the leaf spring 15 causes the drive pin 12 to incline in the direction of arrow a' from the upright state indicated by the alternate long and short dashed line to the inclined state indicated by the solid line in FIG. 2. Then, the force of the drive pin 12 in the direction of arrow a owing to the reactive torque of the pin mounting portion 15a of the leaf spring 15 serves to press the drive pin 12 against the side 5b of the drive hole 5. As a result, the center plate 3 of the disk 1 is moved in the direction of arrow a shown in FIG. 3, so that two sides 4a and 4b of the central hole 4 of the center plate 3 are pressed against the side surface of the central pin 11 of the turntable 10. Thereby, the center line of the disk 1 is aligned with that of the turntable 10.

As shown in FIG. 3, a rotary drive force F1 and a biasing force F2 act on the drive hole 5. The rotary drive force F1 acts against the end edge 5a to rotate the disk 1 in the rotating direction of the turntable 10 (arrow b). The biasing force F2 acts to press the pin 12 against the side edge 5b and bias the drive hole 5 in a direction away from the center of the turntable 10. As a result, reactive forces F3 and F4 are generated on the central pin 11. A resultant force F5 of the reactive forces F3 and F4 serves to press the two sides 4a and 4b of the central hole 4 against the side surface of the central pin 11 and to align the center line of the disk 1 with that of the turntable 10. A diagonal line P of the central hole 4 inclines about 30° in respect to the end edge 5a of the drive hole 5, so that when the forces F1 (=F3) and F2 (=F4) correspond to design values therefor, the line of action of the resultant forces F5 coincides substantially with the diagonal line P of the central hole 4.

However, the conventional apparatus having the above-mentioned construction has the following problems.

Firstly, the force F2 is determined by the torsion of the pin mounting portion 15a of the leaf spring 15. Therefore, the upper limit of the force F2 is limited by the characteristics of the pin mounting portion 15a of the spring.

In contrast to this, the rotary drive force F1 is increased in proportion to the torque loaded on the disk, which mainly depends upon friction loads between the pad 24, the recording/reproducing head 25 and the disk 1.

The rotary drive force F1 and the torque T are given by the following equation:

$$T = F1 \times R1$$

$$F1 = T/R1$$

where R1 is the radial distance of the drive pin 12 from the axis of central pin 11.

This means that the rotary drive force F1 increases in proportion to an increase of the torque T loaded on the disk 1.

When the reactive force F3 increases with an increase in the rotary drive force F1 while the biasing force F2 is kept constant, as indicated by the alternate long and short dashed lines in FIG. 3, the line of action of the resultant force F5 is substantially deviated from the diagonal line P of the central hole 4 in the direction toward side 4b.

In the conventional apparatus described above, there is an upper limit to the torque that may be loaded on the disk 1. In other words, when the torque is exessively increased, the biasing force F2 generated by the leaf spring 15 cannot correctly urge the central pin 11 toward the side 4a of the central hole 4. Therefore, as indicated by the alternate long and short dashed lines in FIG. 3, the side 4a of the central hole 4 floats away from the side surface of the central hole 11. As a consequence, the center line of the disk 1 cannot be correctly aligned with that of the turntable 10.

Since the rotary drive force F1 and the biasing force F2 have a correlation in aligning the center line of the disk 1 with that of the turntable 10, and since the characteristics of the leaf spring 15 for producing the biasing force F2 greatly affect the alignment performance of the disk 1, the characteristics of the leaf spring 15 and the sizes of the respective parts must be controlled with high precision, resulting in an increase in the cost of the overall apparatus.

In the above-described apparatus, in order to align the center line of the disk 1 with that of the turntable 10, the upper limit of the torque loaded on the disk 1 must be limited. For this reason, the frictional force acting between the disk 1 and the pad 24 or the recording/reproducing head 25 must be adjusted with high precision. In addition, the frictional force acting on the drive pin 12 upon contact with the edges 5a and 5b of the drive hole 5 must be kept at a minimum. Because of this, in the conventional apparatus, an expensive ball bearing 14 is mounted on the upper end of the drive pin 12 so as to be able to press the drive pin 12 against the edges 5a and 5b of the drive hole 5 through the ball bearing 14. However, this also increases the cost of the apparatus.

Furthermore, in the above-mentioned conventional apparatus, when the biasing force F2 is generated for pressing the ball bearing 14 of the drive pin 12 against the side edge 5b of the drive hole 5 in the direction of arrow a in FIG. 3, the drive pin 12 is inclined as indicated by the full lines in FIG. 2. For this reason, the center plate 3 placed horizontally on the turntable 10 is affected by the inclination of the drive pin 12 and may be inclined with respect to the turntable 10.

SUMMARY OF THE INVENTION

It is an object of the present invention to provide a rotary drive apparatus for a disk which is capable of reliably centering the latter relative to a drive turntable without limitation of the torque loaded on the disk.

In accordance with an aspect of the invention, a rotary drive apparatus for a disk has a movable mount capable of moving a drive pin within a predetermined range relative to a turntable along a path which is gradually increasingly radically distant from the center of the turntable as the drive pin is moved along such path in a direction opposite to the rotating direction of the turntable, and resilient means for urging the movable mount in the direction to move the drive pin relatively to the turntable in a direction similar to the rotating direction of the turntable, so that the drive pin may be pressed by the edge of a drive hole in reaction to a torque loaded on the disk during rotation of the disk, and thereby moved relatively to the turntable along its path in the direction opposite to the rotating direction of the turntable against the force of the resilient means and gradually increasingly radically distanced from the center of the turntable, so as to align the center of the disk with that of the turntable.

In the apparatus according to the present invention having the above-mentioned construction, a biasing force for maintaining the disk centered in respect to the turntable is increased in proportion to an increase in the torque loaded on the disk. Therefore, the upper limit of the torque is not limited. Even if the torque increases greatly, the center line of the disk can be correctly aligned with that of the turntable.

Furthermore, since there is no upper limit of the torque loaded on the disk, an expensive ball bearing need not be mounted on the upper end of the drive pin and the apparatus according to the present invention can be rendered inexpensive.

Further, in the apparatus according to the invention, the drive pin is not inclined in the disk-centering operation so that the disk will not incline with respect to the turntable and the disk can therefore be stably held horizontally on the turntable.

Another object of the invention is to provide a rotary drive apparatus, as aforesaid, in which the sizes of the respective parts need not be controlled with high precision, manufacture of the parts is easy, and the apparatus is rendered inexpensive.

Still another object is to provide a rotary drive apparatus, as aforesaid, in which there is no upper limit of the torque loaded on the disk so that the frictional force acting between the disk and a pad and recording/reproducing head need not be adjusted with high precision, the design and assembly of the apparatus are easy, and the apparatus is rendered inexpensive.

BRIEF DESCRIPTION OF THE DRAWINGS

FIGS. 1 to 3 relate to conventional rotary drive apparatus of a microfloppy disk, in which FIG. 1 is an overall perspective view, FIG. 2 is a partial, enlarged sectional view, and FIG. 3 is a partial, enlarged plan view for explaining positioning of the disk; and FIGS. 4 to 13 relate to embodiments of a rotary drive apparatus of a microfloppy disk according to the present invention, in which FIG. 4 is an exploded perspective view of a first embodiment, FIG. 5 is an enlarged plan view of the arrangement shown in FIG. 4, FIG. 6 is a sectional view along the line VI—VI in FIG. 5, FIG. 7 is a sectional view along the line VII—VII in FIG. 6, FIGS. 8A and 8B are diagrammatic views for explaining the path of movement of the drive pin, FIGS. 9 and 10 are enlarged plan views for explaining the positioning operation of the disk, and FIGS. 11, 12 and 13 are enlarged plan views showing other respective embodiments of the invention.

DETAILED DESCRIPTION OF THE PREFERRED EMBODIMENT

Figure 1:
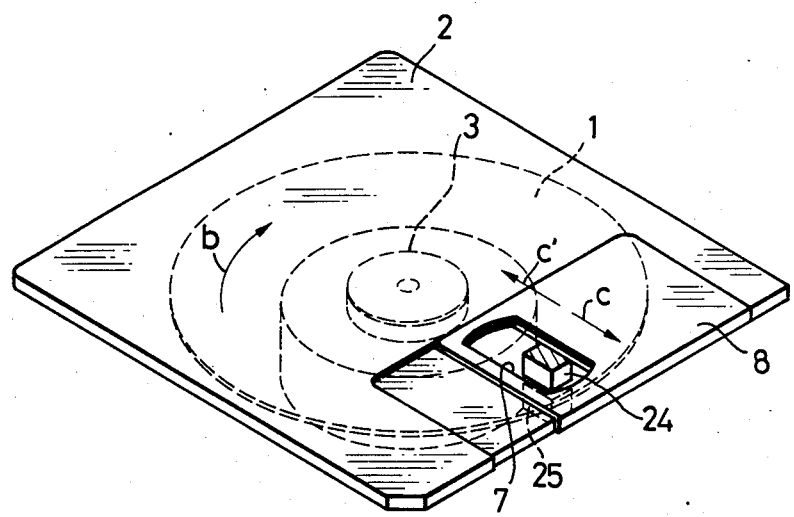
Figure 2:
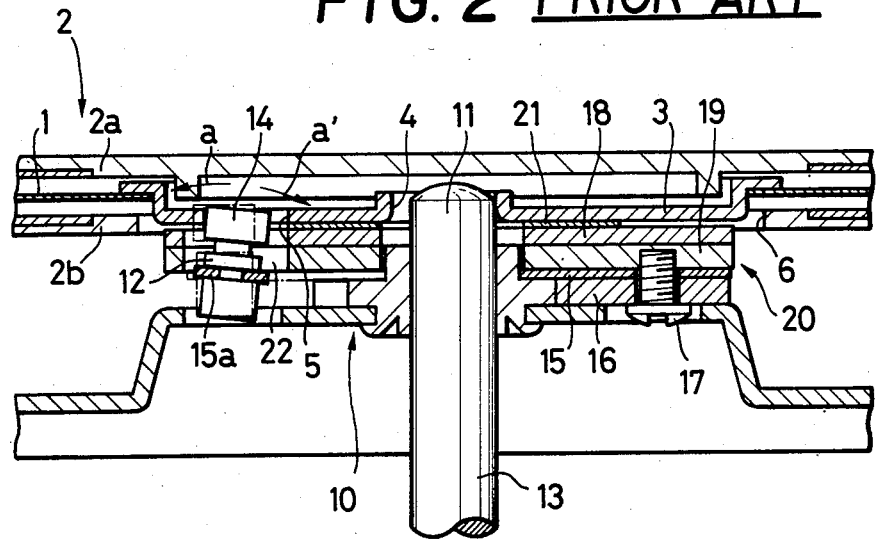
Figure 3:
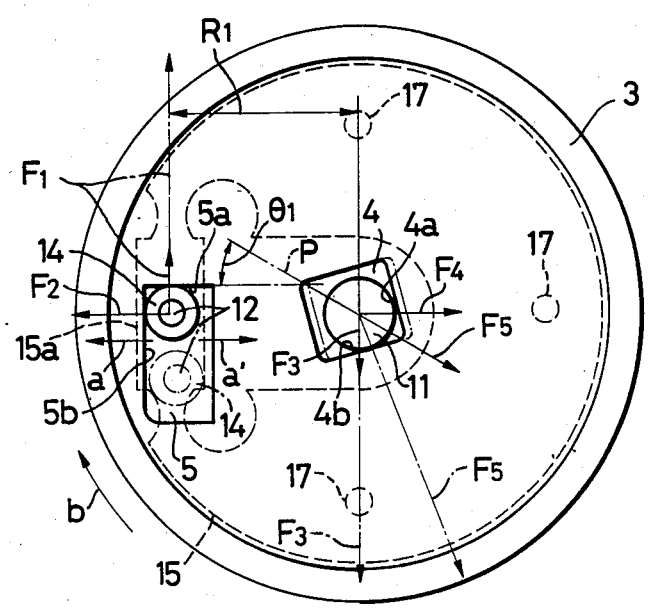

An embodiment wherein of the present invention applied to a rotary drive apparatus of a microfloppy disk (to be referred to as a disk hereinafter) will now be described with reference to FIGS. 4 to 13. A central hole 4 and a drive hole 5 formed in a center plate 3 of a disk 1 to be used with the embodiment shown in FIGS. 4 to 13 are of the same construction as earlier described with reference to FIGS. 1 to 3.

As shown in FIGS. 4 to 7, a central pin 31 and a drive pin 32 are arranged respectively at the center of a turntable 30 and at a position spaced radially therefrom on turntable 30. The central pin or spindle 31 is provided at the upper end of a motor shaft 33 similar to the case of the conventional apparatus. A magnetic chuck 37 is mounted on the turntable 30. This magnetic chuck 37 comprises a yoke plate 35 formed integrally with a bearing member 34 for the motor shaft 33 which is fixed to the turntable 30, and a magnet plate 36 which is fixedly mounted on the yoke plate 35. The magnet plate 36 is made of, for example, rubber magnet material, and a smooth sheet 38 of a nonmagnetic material is fixedly disposed on the bearing member 34.

A ring plate 41 is horizontally arranged outside the periphery of the bearing member 34 within an annular gap 40 between an upper surface 30a of the turntable 30 and a lower surface 35a of the yoke plate 35. A pivot pin 42 is fixed to one side portion 41a of the ring plate 41 and is pivotally inserted in a pivot pin support hole 43 formed in the yoke plate 35 at a position spaced radially from the center of the turntable 30. The ring plate 41 turns horizontally on the pivot pin 42 in the directions of arrows d and d' shown in FIG. 7. The drive pin 32 comprises a columnar pin without a ball bearing, and extends upright from the other side portion 41b of the ring plate 41 which is diametrically opposite the pivot pin 42 with respect to the central pin 31 of the turntable 30. The drive pin 32 projects upward through elongated arcuate holes 44 that are centered at hole 43 receiving the pivot pin 42 and that are formed respectively in the yoke plate 35 and the magnet plate 36.

Figure 5:
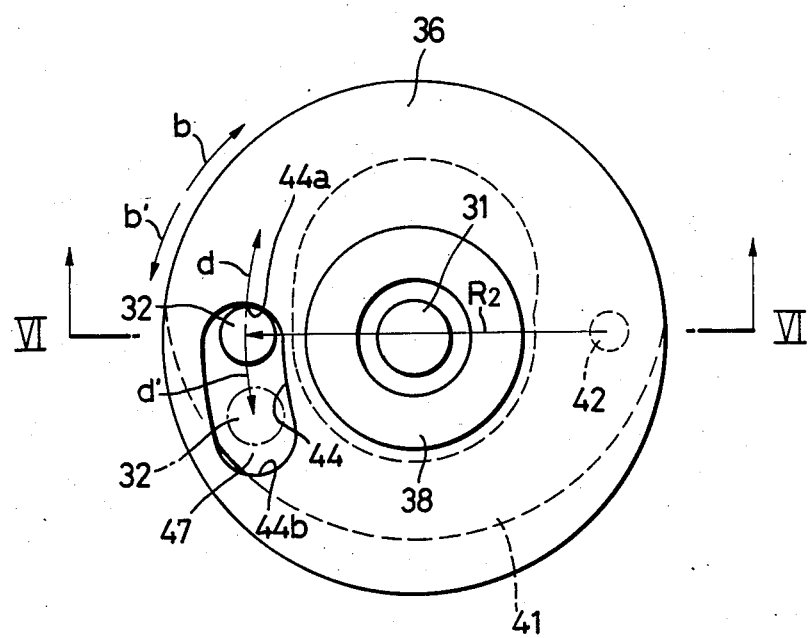
Figure 6:
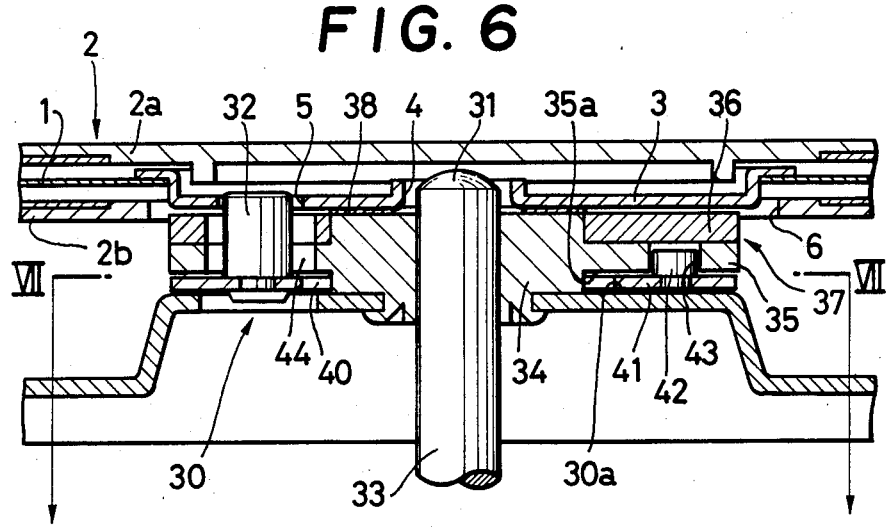
Figure 7:
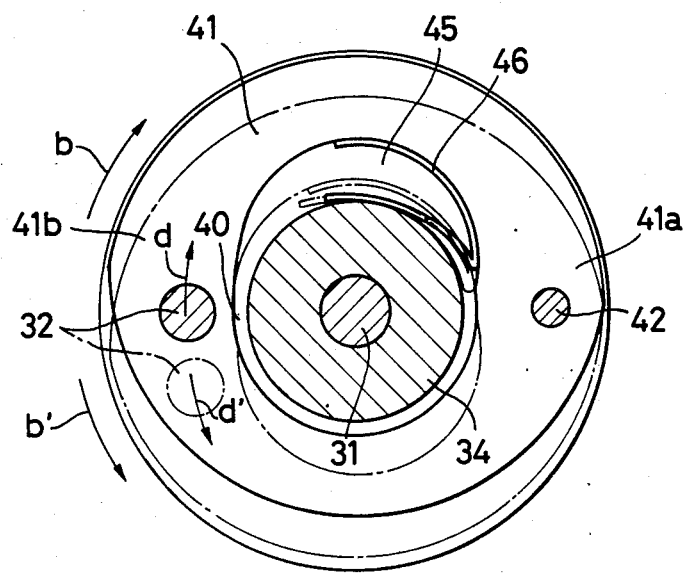

The drive pin 32 is movable in the directions of arrows d and d' on FIGS. 5 and 7 within a predetermined range defined by the arcuately elongated holes 44. Such directions d and d' are generally in the rotating direction of the turntable 30 and in the direction opposed thereto as indicated by arrows b and b'. A spring 46, such as, a substantially V-shaped leaf spring or the like, is inserted in an arcuated gap 45 formed between the inner periphery of the ring plate 41 and the outer periphery of the bearing member 34 (FIG. 7). The spring 46 biases the ring plate 41 in the direction of arrow d, as illustrated in FIG. 7. The spring 46 is weaker than the torque loaded on the disk 1. The drive pin 32 is biased with a weak force in the direction of arrow d, that is, in the rotating direction of the turntable 30, and abuts against and is stopped by an end portion 44a of the hole 44 which is at the front of the latter considered with respect to the rotating direction of the turntable 30.

The relationship between the circular track 11 of the drive pin 32 and a circular track 12 of the drive hole 5 in the center plate 3 of the disk will now be described with reference to FIGS. 8A and 8B.

The track 11 of the drive pin 32 has the pivot pin 42 as a center and this pivot pin 42 is spaced from the central pin 31 of the turntable 30 by a distance E. This track 11 with radius R2 greater than radius R3 of track 12 is gradually away from the central pin 31 as the drive pin 32 is moved relatively to the turntable 30 in the direction opposed to the rotating direction of the turntable 30, i.e. in direction of arrow d'.

When the central pin 31 of the turntable 30 is inserted in the central hole 4 of the disk 1 and the disk 1 is rotated relatively to the turntable 30, the drive hole 5 of the center plate 3 has the central pin 31 as a center and describes a circle with radius R3.

Figure 8A:
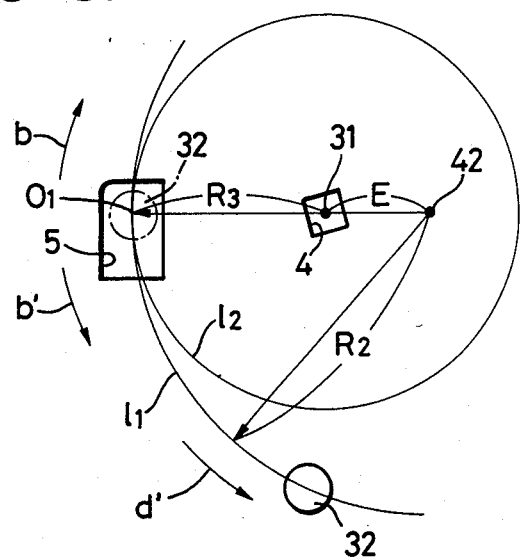

In the case shown in FIG. 8A, where R2−R3=E, and R2>R3, the track 11 of the drive pin 32 contacts with the track 12 of the drive hole 5 at a contact pint 01. In this case, the drive pin 32 biased in the direction of arrow d by the spring 46 abuts against and is stopped by the end portion 44a of the hole 44 which is at the front thereof considered with respect to the rotating direction of the turntable 30 at or near contact point 01 of the tracks 11 and 12.

Figure 8B:
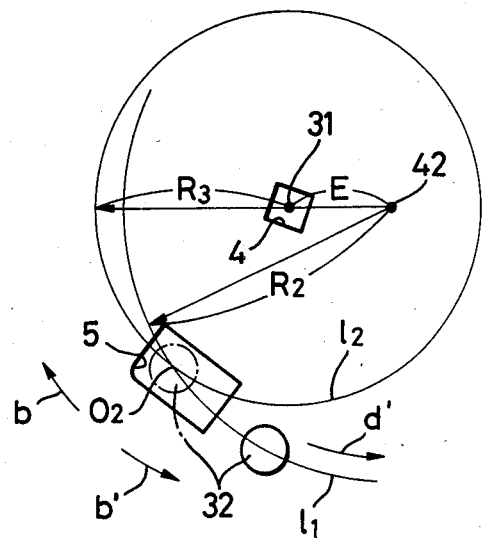

In the case shown in FIG. 8B, where R2−E>R3, and R2>R3, the track 11 intersects with the track 12 at a point 02. The drive pin 32 abuts against and is stopped by the end portion 44b of the hole 44 which is toward the back with respect to the rotating direction of the turntable 30 at or near the point of intersection 02 of the tracks 11 and 12.

As shown in FIGS. 8A and 8B, the following condition is preferable:

$R2-R3 \leq E$ $R2-E \leq R3$

The alignment of the center line of the disk 1 with that of the turntable 30 when the disk 1 is horizontally mounted on the turntable 30 is performed as described below with reference to FIGS. 9 and 10.

Figure 9:
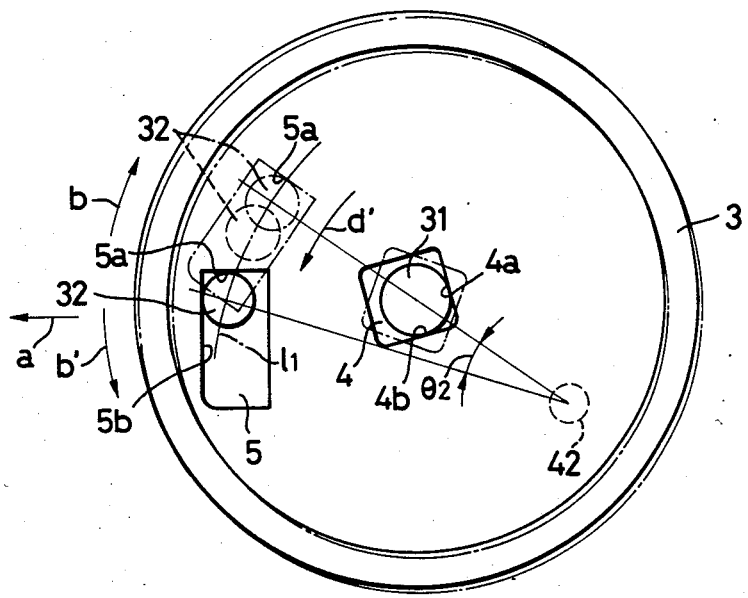

Referring to FIG. 9, while the drive pin 32 is inserted at a position (dotted line) in the drive hole 5 which is toward the back with respect to the rotating direction of the turntable 30 indicated by the alternate long and short dashed line and when the turntable 30 is rotated in the direction of arrow b, the drive pin 32 is moved in direction of arrow b within the drive hole 5 and abuts against the end 5a of the drive hole 5 which is at the front with respect to the rotating direction of the turntable 30, as indicated by the alternate long and short dashed line. When the turntable 30 is further rotated in direction of arrow b, the end 5a reacts against the drive pin 32 in the direction toward the back with respect to the rotating direction of the turntable 30 against the spring 46, i.e. in direction of arrow b'. Then, the drive pin 32 which has the pivot point 42 as a pivoting center is moved relatively to the turntable 30 in direction of arrow d' and is thereby gradually displaced radially away from the central pin 31 of the turntable 30. When the drive pin 32 is moved by a predetermined angle $\theta 2$ in the direction of arrow d' as indicated by the solid line, the drive pin 32 is strongly pressed against the radially outer side 5b of the drive hole 5. At this time, as indicated by the alternate long and short dashed line in FIG. 5, the drive pin 32 does not abut against the end 44b of the hole 44 which is toward the back with respect to the rotating direct of the turntable 30 and a gap 47 is formed between the drive pin 32 and the end 44b of the hole 44.

In this manner, the torque loaded on the disk 1 serves to press the end 5a of the drive hole 5 against the drive pin 32. As a result of the foregoing, the drive pin 32 is moved relatively to plates 35 and 36 toward the back with respect to the rotating direction of the turntable 30 against the force of the spring 46, so that the drive pin 32 is gradually displaced radially away from the central pin 31 of the turntable 30. A force derived from this radial displacement presses the drive pin 32 strongly against the outer side 5b of the drive hole 5. As a result, the center plate 3 is moved in the direction of the arrow a shown in FIGS. 9 and 10, i.e. in a direction radially away from the central pin 31 of the turntable 30. Thus, the center line of the disk 1 is aligned with that of the turntable 30, and the center plate 3 is rotatably coupled to the turntable 30 through the drive pin 32. The disk 1 and the turntable 30 are then driven together in the direction of arrow b.

Figure 10:
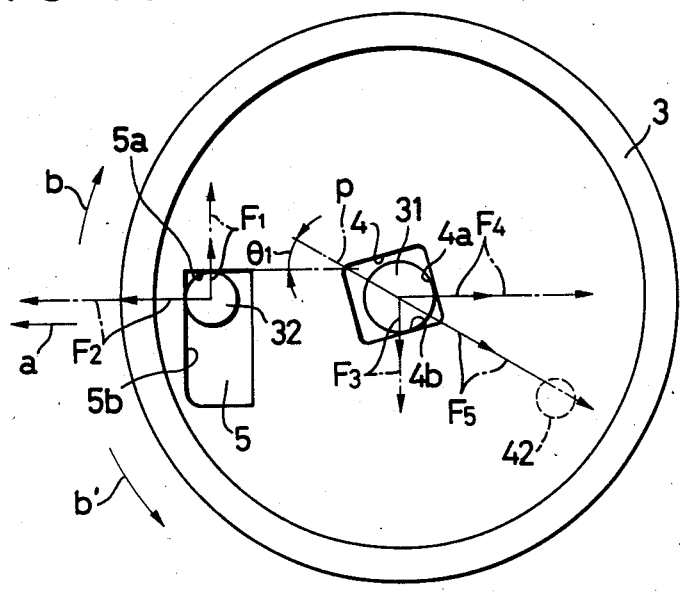

As shown in FIG. 10, as in the case of the conventional apparatus the rotary drive force F1 and the biasing force F2 act on the drive hole 5 by means of the drive pin 32. The resultant force F5 of the reactive forces F3 and F4 generated in the central pin 31 serves to press two converging sides 4a and 4b of the cylindrical central hole 4 against the side surface of the central pin 11. Thus, the center of the disk 1 is aligned with that of the turntable 30.

As described above, the biasing force F2 is generated in response to the torque loaded on the disk 1. Therefore, the biasing force F2 and also the rotary drive force F1 are proportional to the torque loaded on the disk 1. As indicated by the alternate long and short dashed line in FIG. 10, when the torque loaded on the disk 1 is increased, the rotary drive force F1 and the biasing force F2 increase in proportion thereto. Since the forces F1 and F2 increase in proportion to an increase in the torque, the reactive forces F3 and F4 also increase in proportion thereto. For this reason, the line of action of the resultant force F5 falls always substantially on the diagonal line P of the central hole 4. The direction of the resultant force F5 will not deviate widely from the diagonal line P of the central hole 4 toward the side 4b, as distinguished from such deviation experienced with the conventional apparatus. Since the resultant force F5 stably increases and remains substantially on the diagonal line P with an increase in the torque loaded on the disk 1, the larger the increase in the torque, the higher is the precision of the alignment of the center line of the disk 1 with that of the turntable 30.

Accordingly, there is no upper limit of the torque loaded on the disk 1. Even if the torque increases excessively, the correct alignment of the centerline of the disk 1 with that of the turntable 30 is ensured.

Since the torque loaded on the disk 1 is not limited, it is not necessary to reduce the frictional forces generated between the drive pin 32 and the end and side 5a, 5b of the drive hole 5 and the ball bearing 14 used in the conventional apparatus is not required.

When the ring plate 41 is horizontally pivoted on the turntable 30, the drive pin 32 can be stably pressed in a vertical posture against the end and side 5a and 5b of the drive hole 5. Therefore, the center plate 3 will not obliquely float on the turntable 30.

Figure 11:
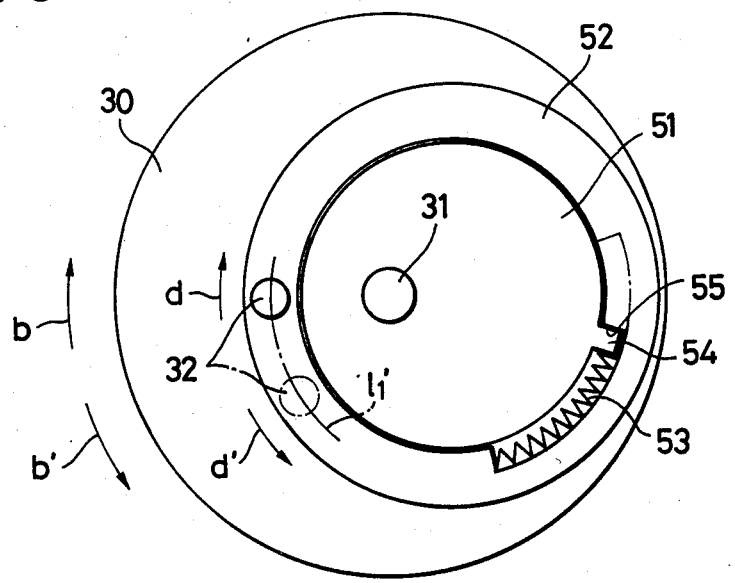

FIG. 11 shows another embodiment of the present invention. In this embodiment, an eccentric bearing 51 is fixed to a turntable 30, and an eccentric outer ring 52 is rotatably mounted on this eccentric bearing 51. A drive pin 32 extends upright on the eccentric outer ring 52. The eccentric outer ring 52 is urged urged relative to bearing 51 in the direction of arrow d by a spring 53. An abutment surface 55 disposed on the eccentric outer ring 52 abuts against a stopper 54 disposed on the eccentric bearing 51. The drive pin 32 is thus urged to the position indicated by the solid line.

In this embodiment, when the drive torque reacts on the drive pin 32 in the direction of arrow d' against the spring 53, the eccentric outer ring 52 is rotated around the eccentric bearing 51 in the direction of arrow d' and the drive pin 32 is moved along a track ll' substantially similar to the track ll, as indicated by the alternate long and short dashed line.

Figure 12:
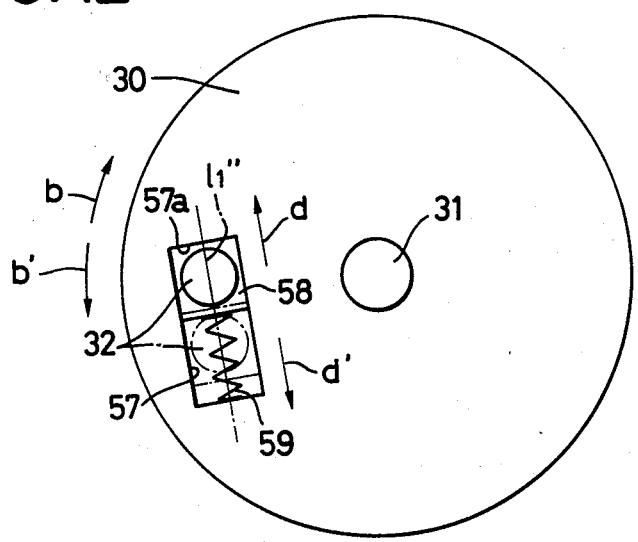

FIG. 12 shows another embodiment. In this case, a slider 58 is slidable within a rectilinearly elongated hole 57 formed in a turntable 30. A drive pin 32 extends upright on the slider 58. The slider 58 is urged in the direction of arrow d by a spring 59 so as to abut against an end 57a of the elongated hole 57 at the front thereof considered with respect to the rotating direction of the turntable 30. The drive pin 32 is thus urged to the position indicated by the solid line.

When the drive pin 32 is pressed, in reaction to the torque, in the direction of arrow d' against the spring 59, the slider 58 is slid in the elongated hole 57 in the direction of arrow d'. The drive pin 32 is then moved along a track ll" which is increasingly radially distant from the center of pin 31 similar to the track ll, as indicated by the alternate long and short dashed line.

Figure 13:
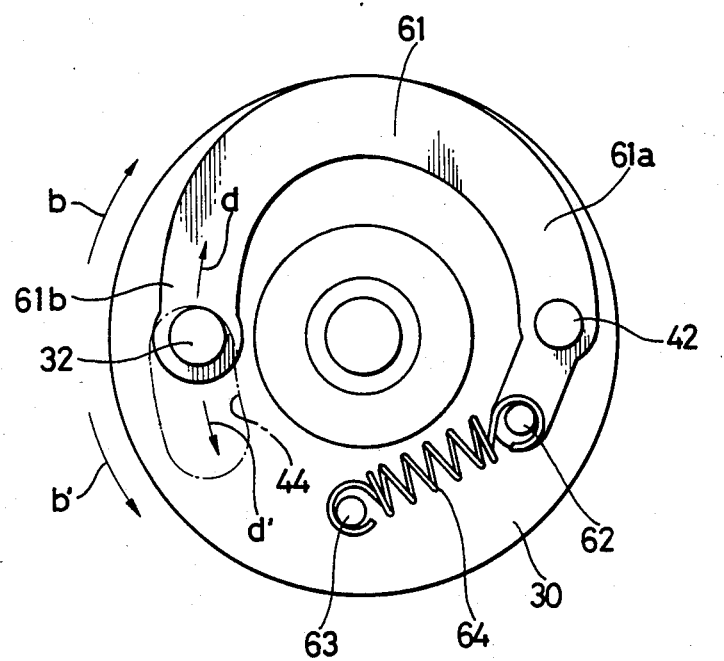

FIG. 13 shows still another embodiment in which a substantial portion of the lower half of the ring plate 41 shown in FIG. 7 is cut away to form a curved rotating arm 61. One end portion 61a of the rotating arm 61 is pivotally supported by a turntable 30 through a pivot pin 42. A drive pin 32 stands upright on the other end portion 61b of the rotating arm 61. A tension spring 64 is hooked between an outer pin 62 on an extension of the end portion 61a of the rotating arm 61 and an anchor pin 62 on the turntable 30. The spring 64 urges the rotating arm 61 to pivot in the direction for moving drive pin 32 in the rotating direction of the turntable 30 (in the direction of arrow b or d). The drive pin 32 is again movable within an elongated hole 44 formed in the turntable 30 in directions of arrows d and d'.

Although the present invention has been described with respect to particular embodiments thereof, the present invention is not limited thereto and various changes and modifications may be made within the spirit and scope of the present invention.

The present invention is not limited to a rotary drive apparatus for a microfloppy disk but can be applied to a rotary drive apparatus for other recording and/or reproducing disks.

What is claimed is:

1. A rotary drive apparatus for a disk having a central hole and a drive hole spaced radially from said central hole, said apparatus comprising a turntable rotatable in a predetermined forward direction, a central pin on said turntable arranged concentrically with the latter and engageable in said central hole of a disk positioned on the turntable, a drive pin engageable in said drive hole of the disk positioned on said turntable for acting against an edge of the drive hole and thereby driving the disk in said forward direction upon rotation of the turntable, means mounting said drive pin on said turntable for limited movement relative the latter in a path extending from an initial position in a direction opposed to said predetermined forward direction, of rotation, said path being increasingly distant from the center of said turntable in said direction opposed to said predetermined forward direction, and yieldable means acting on said means mounting the drive pin for urging the latter along said path in said forward direction to said initial position, said yieldable means exerting a force on said drive pin that is less than the reaction force of said edge of the drive hole against said drive pin when the latter drives the disk so that the drive pin is displaced along said path from said initial position by said reaction force and acts radially outward against an edge of said drive hole with a force proportional to said reaction force for reliably holding the edge of said central hole against said central pin.

2. A rotary drive apparatus according to claim 1; in which said drive hole is substantially rectangular and has a forward edge portion extending approximately radially in respect to the center of said disk and constituting said edge acted against by the drive pin for driving the disk and an outer side edge portion substantially at right angles to said forward edge portion constituting said edge against which the drive pin acts for holding the edge of said central hole against said central pin.

3. A rotary drive apparatus according to claim 2; in which said central hole of the disk has converging side edge portions engageable with said central pin and arranged in respect to said forward and outer side edge portions of the drive hole so that a line of action of the resultant of forces holding said edge of the central hole against said central pin will substantially bisect an angle between said converging side edge portions irrespective of the resistance to rotation of the disk with said turntable.

4. A rotary drive apparatus according to claim 1; in which said means mounting the drive pin includes a mounting member to which said drive pin is fixed, and means guiding said mounting member for rotational displacements relative to said turntable about a center of rotation spaced from said center of the turntable.

5. A rotary drive apparatus according to claim 4; in which said yieldable means is a spring.

6. A rotary drive apparatus according to claim 4; in which said mounting member is ring-like and extends around said center of the turntable, said drive pin is fixed on said ring-like mounting member at one side of said central pin of the turntable, and said means guiding the mounting member is a pivot pin defining a pivoting axis for said ring-like mounting member at the opposite side of said central pin.

7. A rotary drive apparatus according to claim 4; in which said mounting member is in the form of an elongated arm having said drive pin at one end, and said means guiding the mounting member is a pivot pin at the other end of said arm and carried by said turntable at a side of said central pin remote from said drive pin.

8. A rotary drive apparatus according to claim 4; in which said mounting member is movable only in a plane perpendicular to the axis of rotation of the turntable, and said drive pin is rigidly secured to said mounting member in upstanding perpendicular relation thereto.

9. A rotary drive apparatus according to claim 4; further comprising magnetic chuck means incorporated in said turntable around said central pin for attaching a central portion of the disk to said turntable, said magnetic clutch means having an elongated hole extending therethrough and spaced from said central pin with said drive pin extending upwardly through said elongated hole.

10. A rotary drive apparatus according to claim 4; in which said mounting member is in the form of a circular ring having said drive pin rigidly secured thereon in upstanding relation, and said means guiding the mounting member includes a circular bearing eccentrically located in respect to said center of the turntable and about which said ring is rotatable.

11. A rotary drive apparatus according to claim 1; in which said means mounting the drive pin includes a slider having said drive pin upstanding therefrom, and an elongated hole in said turntable extending substantially at right angles to a radius of the turntable and along which said slider is slidable.

* * * * *